Figure 1:
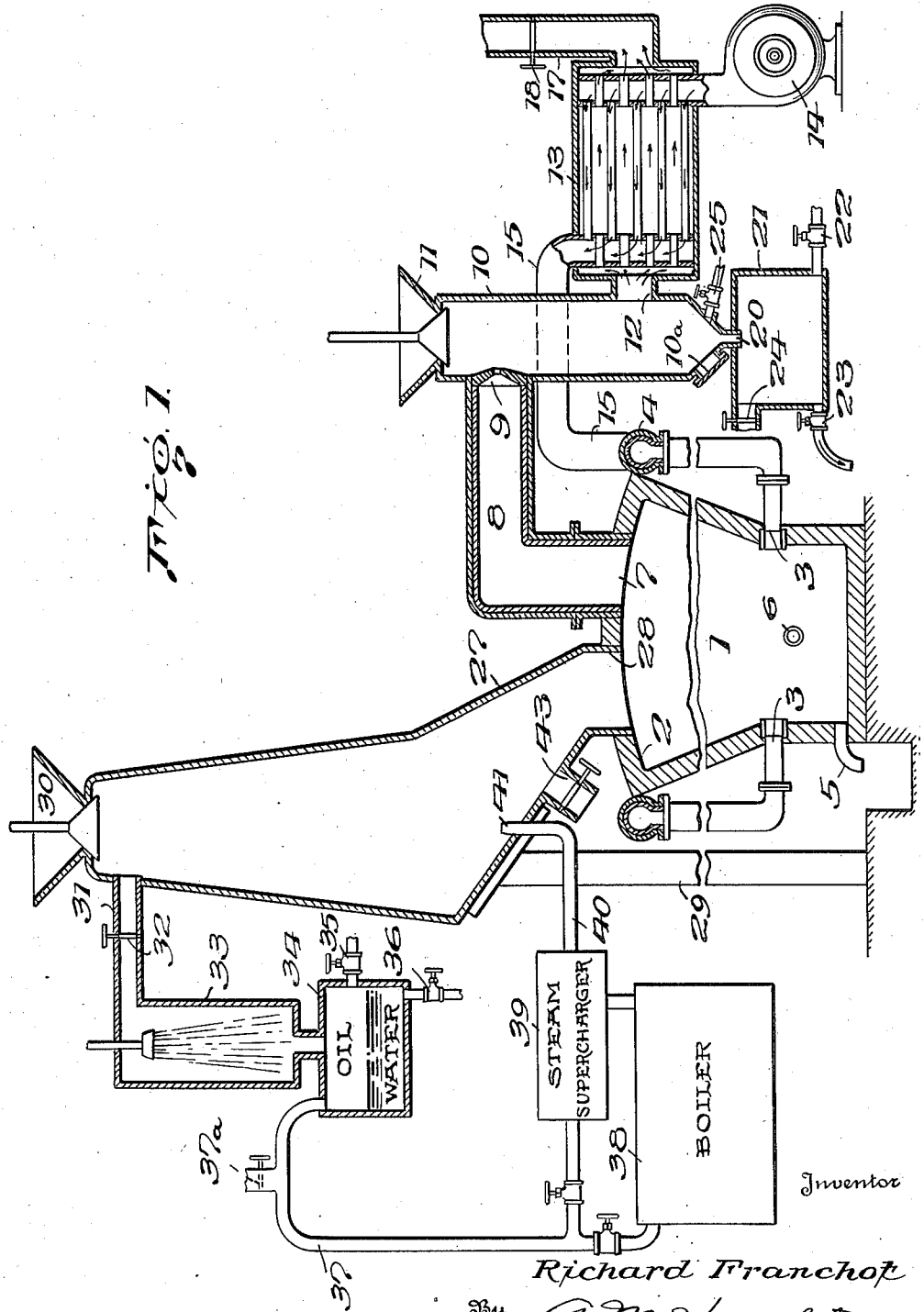

Dec. 26, 1944.   R. FRANCHOT   2,365,868
NITROGEN FIXING BLAST FURNACE
Filed Aug. 3, 1942   3 Sheets-Sheet 1

Inventor
Richard Franchot
By A. M. Houghton
his Attorney

Dec. 26, 1944. R. FRANCHOT 2,365,868
NITROGEN FIXING BLAST FURNACE
Filed Aug. 3, 1942 3 Sheets-Sheet 3

Inventor
Richard Franchot
By A. M. Houghton
his Attorney

Patented Dec. 26, 1944

2,365,868

UNITED STATES PATENT OFFICE 2,365,868

NITROGEN-FIXING BLAST FURNACE

Richard Franchot, Washington, D. C., assignor to Ferro Nitrogen Corporation, Washington, D. C., a corporation of the District of Columbia Application August 3, 1942, Serial No. 453,446

7 Claims. (Cl. 266—10)

This invention relates to nitrogen fixing blast furnaces; and it comprises a metallurgical blast furnace for producing iron and various ferroalloys wherein a hearth-bosh section of a usual or conventional type of structure provided with plural air tuyères for introducing under substantial positive pressure jets or blasts of preheated air, is covered by a top or roof of suitable refractory material and having regulated hot gas outlet means of adequate cross sectional area for leading vertically out of the furnace under controlled back pressure any desired proportion of the gases produced from the air introduced into the hearth, and a shaft section of the furnace delivers solids to the bosh through an unobstructed opening in the bosh cover adapted to afford free passage of gas from bosh to shaft, the shaft having the usual charging means at the remote end with pressure controlling gas outlet means, and the hot gas outlet being connected, advantageously through condensing and cleaning means, to a heat interchanger for preheating the air blast by transfer thereto of sensible heat from the hot gas withdrawn from the furnace through the bosh cover; all as more fully hereinafter set forth and as claimed.

As is known, the blast furnace smelting iron ore with coke functions as a gas producer. As a matter of fact, usually about half and often more of the coke energy leaves the furnace in the form of carbon monoxide in the top gas; the ratio of CO to $CO_2$ being seldom under 2:1. In other words, over two thirds of the coke carbon is converted to CO in the smelting process and thus some 50 per cent of the fuel value remains in the gas. Usually the furnace functions more efficiently as a gas producer than as an iron smelter.

A quite generally held theory purporting to account for the gas producing function of the blast furnace was first offered by Lowthian Bell (Chemical Phenomena of Iron Smelting—1872, D. Van Nostrand, New York). This theory is based upon static equilibrium relations in the reduction of iron oxides by carbon monoxide forming $CO_2$. The theory assumes that the primary function of the coke burning with blast oxygen to CO at the tuyères is to provide a great excess of reducing gas needed to reduce the ore to metal. This theory has been regarded by many as full explanation of the low efficiency of the blast furnace in metallizing iron ore.

Johnson (Principles, Operation and Products of the Blast Furnace. 1918, McGraw Hill, New York) has pointed out that the foregoing theory was erroneous and showed that the main function of the coke burned by preheated air is to supply heat to the hearth; the ore reduction being a secondary function, or as Johnson expressed it, the composition of the top gas is an effect rather than a cause. It is now quite clear that the burden ratio of ore to coke, that is, the coke consumption per unit of iron is determined by conditions existing in the hearth, the zone of highest temperature in the furnace. It is evident therefore that the Bell theory failed to take into account the second law of thermodynamics.

A fact of blast furnace practice which has not heretofore been generally recognized is that the heat generated by coke combustion in the hearth is in great excess over the amount of heat that can be used in the smelting process. This excess is often over 100 per cent and accounts for "solution loss" which is usually responsible for more than half of the carbon monoxide gas produced. It can be truly stated that this excess heat generated in the hearth is largely responsible for the gas producing function. The excess heat is of course carried into the shaft by the gas produced in the hearth and in effect makes the furnace a gas producer.

In this connection it has been more recently discovered that the alkali cyanides in the furnace, first noted about a century ago, are present in sufficient quantity to act as a serious factor limiting the burden ratio of ore to coke and thus the production of iron. As a matter of fact furnaces smelting different ores have shown amazingly high concentrations of potassium cyanide vapor in the producer gas formed by the blast. Concentrations of cyanide vapor in the gaseous products of coke combustion before the tuyères, have been found as high as 10 pounds KCN equivalent per 1000 cubic feet of gas. Observed concentrations of KCN vapor in the hearth gases, associated with potash accumulation, are sufficient to account for as much as 40 per cent of the "hearth heat" available at the high temperature existing at the tuyère level; hearth heat being defined as the sum of the heat of CO formation plus the blast heat, and the sensible heat of carbon at the hearth temperature minus the sensible heat of the producer gas consisting of carbon monoxide and nitrogen. Of the hearth heat as thus defined, a substantial quantity is taken up in decomposing the blast moisture to form CO and $H_2$. The beneficial effect upon furnace economy of drying the blast is well known.

In a copending application Serial No. 428,770, filed January 29, 1942, I have described and claimed a means for improving the smelting efficiency of the blast furnace by reducing the accumulation of potash, thus releasing hearth heat otherwise utilized in cyanide vapor formation and by using the released heat to increase the burden ratio of ore to coke. The described apparatus effects removal of cyanide vapor through throttled outlets in extremely small fractions of the furnace gas carrying large fractions of the potash going into the furnace in ore and coke. The potash input is thus afforded a third outlet from the furnace in addition to those afforded by the slag and the top gas.

In the present invention advantage is taken of the discovery that the chemical activity of the blast nitrogen in forming cyanide vapor in the hearth is responsible for large proportions of the coke consumed in metallizing iron ores in the blast furnace. The proportion of coke consumed in fixing blast nitrogen is, as I have found, as much as 50 per cent or more. Accordingly it is an object of this invention to provide means whereby the fixation of blast nitrogen as cyanide can be fully controlled and the furnace can function to fix blast nitrogen with recovery of cyanide and of reduced metal in desired proportions. In short, the present invention comprises a nitrogen fixing blast furnace adapted to recover the nitrogen fixed and which now goes to waste.

In the prior art unsuccessful attempts have been made to recover cyanide formed in the blast furnace. In accordance with the present invention the blast furnace is adapted in structure to recover cyanide and thus to function as means for producing reduced metals and fixed nitrogen as byproducts.

This application is a continuation in part of a prior and copending application Serial No. 387,487, filed April 8, 1941, which is a division of application Serial No. 262,717, filed March 18, 1939, now Patent No. 2,261,516, granted November 4, 1941.

Figure 2:
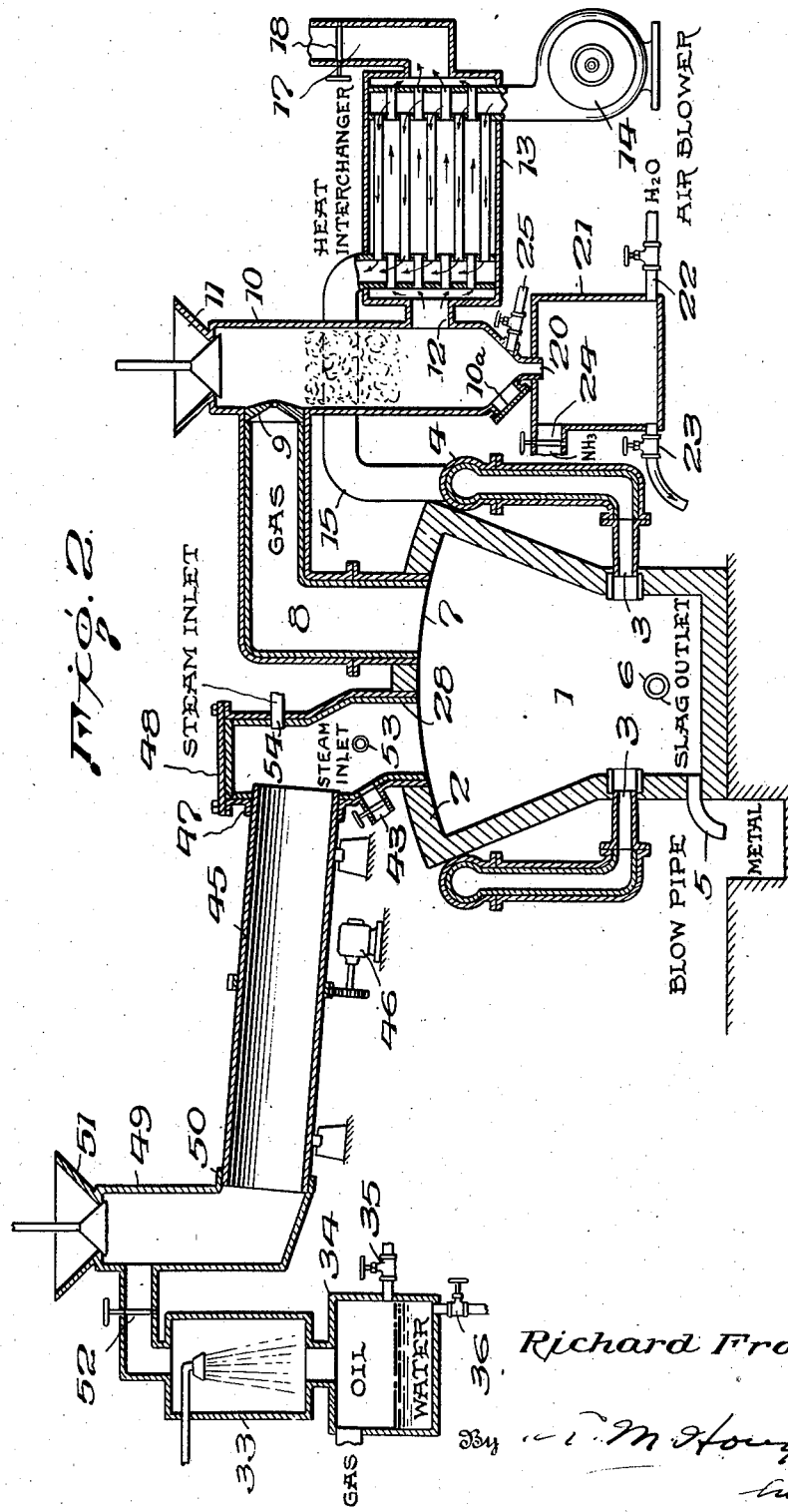
Figure 3:
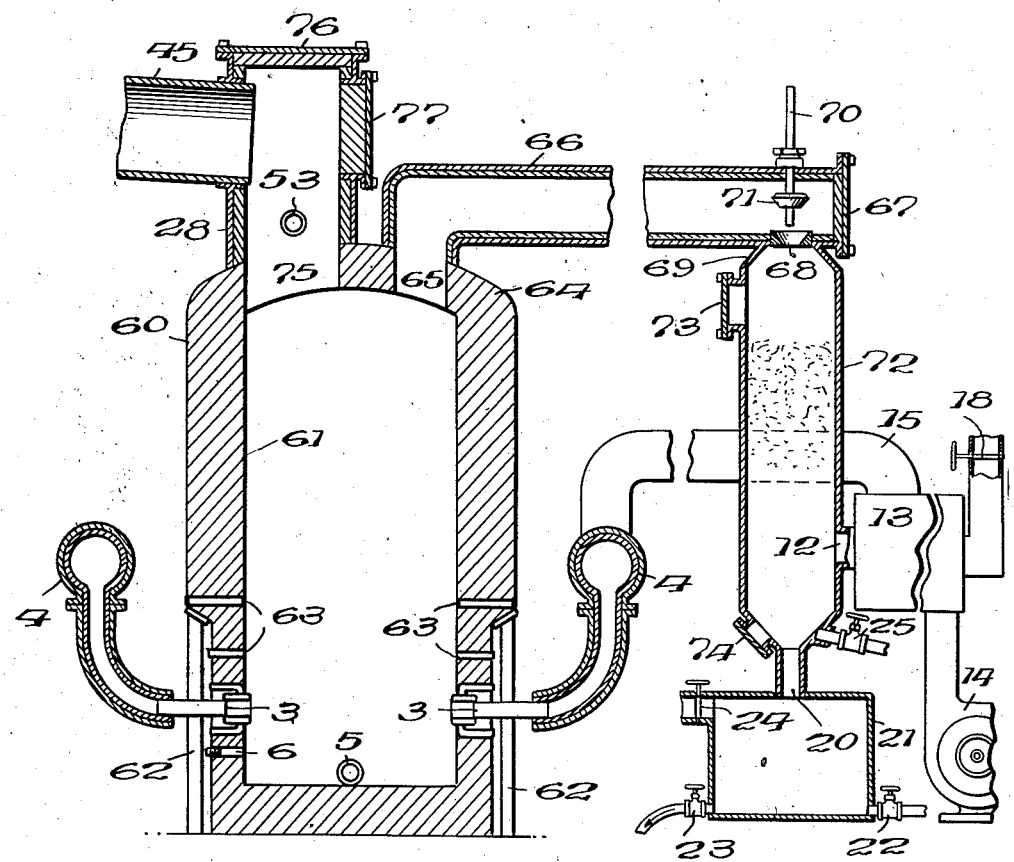

In the accompanying drawings are shown, more or less diagrammatically, blast furnace structures with accessories illustrating the invention and adapted to function in the described manner. In this showing, Fig. 1 is a sectional view in elevation of a nitrogen fixing blast furnace adapted to recover substantial proportions of cyanide formed by fixation of blast nitrogen, Fig. 2 is a similar view of a furnace of modified structure functioning like the furnace of Fig. 1, and Fig. 3 is a similar view of a further modification of the furnace structure and accessories.

Referring to Fig. 1, a blast furnace hearth and bosh 1 of usual construction is provided with a top cover or roof 2 of refractory material such as firebrick. The hearth has air tuyères 3 supplied with preheated air from a surrounding bustle pipe 4 provided with suitable connecting members. A metal outlet 5 and slag outlet 6 are shown. A hot gas outlet 7 runs through the roof 2. A gas conduit 8 lined with refractory insulated material conveys hot gases from the hot gas outlet 7 to a condenser 10 adapted to condense cyanide vapor and to collect liquid cyanide as condensed from the hot gases. Advantageously a refractory nozzle member 9 terminates the conduit 8 and restricts the flow of gases through outlet 7, maintaining a relatively high gas pressure in the furnace.

As shown, condenser 10 is provided with a bell and hopper 11 for charging carbon and soda (for instance, sodium carbonate, or sodium formate) in admixture into the condenser to serve as endothermic cooling agents for the hot gas, aiding in condensation of cyanide vapor to the molten or liquid form. The condenser has a manhole 10a near the bottom. From the condenser in its lower portion, a gas conduit 12 leads to heat interchanger 13 which may be of a known metal or other suitable construction adapted to recuperate and transfer sensible heat from the gas to the air blast blown by blower 14 through the interchanger or recuperator to air conduit 15 leading to air bustle pipe 4. From the interchanger a gas conduit 17 provided with a valve 18 leads the cooled gas to a place of use (not shown). The gas is advantageously utilized in a gas engine-generator plant which transforms producer gas into electric power. A small portion of this power may be used for operating pressure blower 14.

The cyanide condenser 10 is shown as provided with a bottom outlet 20 for liquid cyanide. This outlet may deliver into a hydrolysis chamber 21 with a gas-tight connection, the chamber being provided with a valved inlet 22 for steam and water and a bottom solution outlet 23. A valved gas outlet 24 is also provided near the top of the chamber for conducting ammonia gas formed in hydrolysis of cyanide. A secondary tapping hole 25 is also shown in the bottom of the condenser 10.

The furnace shaft 27 communicates with the bosh and hearth through a shaft chute 28 which runs through the bosh roof 2. The shaft 27 is shown supported by pillars 29, although any other convenient supporting means may be employed. At the top of the shaft a hopper and bell 30 serve for charging fuel into the furnace. Near the top of the shaft a gas outlet 31, controlled by valve 32 provides exit for gases passing from the furnace hearth up through the shaft. This gas outlet may run to a scrubber 33 where condensable products may be removed from the shaft gas to be collected as liquid in chamber 34. This chamber is shown provided with valved liquid outlets 35 and 36 at different levels and with gas outlet conduit 37, having a valved branch 37a. The gas conduit is shown with a connection leading to boiler 38 and steam superheater 39, from which superheated steam may be run through pipe 40 to steam inlet 41 in the lower part of shaft 27. The shaft may be provided with a valved outlet 43 for carbonized material.

In Fig. 2 is shown a modified blast furnace having the hearth and bosh, hot gas outlet and appurtenances similar to those shown in Fig. 1. In the modified furnace, the shaft section comprises a horizontally inclined rotary kiln 45 operatively connected (by gears) to rotating means 46, such as a motor.

The kiln is adapted to discharge into shaft chute 28, which communicates with the furnace bosh through cover 2. The kiln has a gas tight connection 47 at the lower end with chute 28, the latter having a closed removable cover 48. At the upper end of the kiln, a vertical charging chamber 49 delivers into the kiln through a gas tight connection 50. The charging bell hopper 51 and the valved gas outlet conduit 52 are similar in function to those shown in Fig. 1 (30 and 31). Steam inlets 53, 54 are shown in chute 28 which connects the horizontal furnace shaft to the bosh and hearth.

Fig. 3 shows a further modification of the furnace and accessories in which the hearth-bosh section 60 is relatively high and provided at its upper portion with a relatively thickened wall 61. This heavier wall may be supported by pillars 62 adequate in number and spaced around the furnace. The bustle pipe, tuyeres, metal and slag outlets are conventional and similar in function to those of Figs. 1 and 2. Water cooling plates 63 for the bosh wall are shown. As shown, the higher bosh is covered by a roof member 64 which is built of refractory brick and arched over the bosh. Through the bosh cover 64 the outlet opening 65 is formed to take gases vertically out of the furnace and refractory lined conduit 66 leads the gas flowing upwardly through the cover opening in a horizontal direction away from the furnace. This horizontal conduit ends with a flanged closure 67. In the bottom of the conduit near the flanged end, is placed a throttling nozzle 68, turning the flow of gases downwardly into condensing chamber 72 with a bell-shaped connection 69 between nozzle and condenser. Chamber 72 is adapted to filter and clean the gas and to recover condensed cyanide and similar matter. It may contain adsorbent carbon as filtering material. Above nozzle 68 a rod 70 is operated through a stuffing gland in the wall of conduit 66 to clear the nozzle opening of obstruction. Rod 70 may carry refractory cone 71, serving to close the nozzle opening when desired. Chamber 72 has near top and bottom two manholes 73 and 74 through which the filter material may be charged and discharged. Cyanide receptacles, gas conduit, heat interchanger and valved gas exit are similar in function to those of Figs. 1 and 2. The shaft section of the furnace in open communication with the bosh through opening 75, is shown in form like the rotary shaft of Fig. 2. The chute 28 may have flanged closures 76 and 77, with refractory linings.

In operation, the blast furnaces of all three Figs. 1, 2 and 3 are adapted to function similarly in production of cyanide and of reduced metal as byproducts. This dual function is carried on simultaneously and the relative proportions of the cyanide and the metal produced by the expenditure of fuel energy can be varied as desired between rather wide limits. High grade producer gas withdrawn through the bosh cover outlet is always a third byproduct and most of this is available as "surplus gas" not needed to be burned for the purpose of supplying blast heat in hot blast stoves. It is usually advantageous, however, to produce a surplus of CO gas over that needed as fuel to supply the power used in blowing "wind" into the furnace.

An essential element in the apparatus above described is the cover or roof member forming the top of the bosh and carrying the hot gas outlet. This bosh cover divides the furnace into two integrated sections, hearth-bosh and shaft communicating through an unobstructed opening formed in the bosh cover. The hot gas outlet in the bosh cover can be made of sufficient size to withdraw from the furnace all the surplus gas produced from the air blast and not needed for work in the shaft. This withdrawn surplus may be over half of the bosh gas. In effect the shaft and the bosh gas outlet are regulated ducts leading gas from the bosh. In regulating the respective portions of gas passing out through the bosh gas outlet and through the shaft to pass out the top of the furnace, the nozzle and valve 18 maintaining a back pressure in the cyanide condenser may cooperate with the valve in the top gas outlet. Proportioning the gas going through the shaft to the work required to be performed there, is an important function of the apparatus arrangement, permitting adjustment of the burden ratio in accordance with the hearth heat available for completing the smelting process.

More particularly, the regulated withdrawal of surplus gas under pressure from the furnace in a vertical direction through the bosh cover permits adjustment of the proportions of the fuel energy used respectively in the smelting process and in the fixation of nitrogen as cyanide. In this operation, the proportion of potash or other alkali, soda, etc., charged with the fuel is coordinated with the proportion of gas passed through the bosh gas outlet which affords outlet for cyanide vapor from the furnace. Such coordination determines the accumulation of alkali in the furnace and the nitrogen fixation. An example of the coordinating function of the bosh gas outlet is shown in a furnace operation comprising production of one gross ton basic pig iron and 0.6 ton slag from a charge of 2 tons ore, with one half ton limestone and 1700 pounds coke carbon, of which 90 pounds goes into the pig to give it 4 per cent carbon content. Of 1610 pounds carbon per ton pig, all gasified in the hearth by the hot blast, less than half is required to generate the heat needed to heat the metal and slag to the temperature required for their separation and to burn the limestone. And the CO gas from half the carbon gasified by air is more than sufficient to reduce the ore to metal by exothermic action forming $CO_2$. Hence it follows that at least one half of the carbon burning with air in the hearth is available for the purpose of fixing blast nitrogen in the form of cyanide vapor. The usual ore, coke, and limestone fed to the blast furnace contain potash and soda equivalent to at least one per cent KCN by weight of the pig iron produced. The amount of heat required to form cyanide vapor in the hearth being that available with ordinary blast temperatures in gasifying some 5 pounds carbon per pound of nitrogen contained in the vapor of potassium or sodium cyanide, it is found that in making basic pig iron as described the furnace can produce as a byproduct at least 800 pounds potassium cyanide containing 160 pounds fixed nitrogen per ton pig. This is possible by adding alkali to the charge. The cyanide yield can be more than 35 per cent by weight of the pig iron. The nitrogen fixed is 10 per cent by weight of the coke carbon consumed.

In the operation, the bosh gas outlet has the function of coordinating the withdrawal and recovery of cyanide, with the charge of potash or soda in or with the ore and coke and thus of adjusting the burden of ore and of alkali. With a given percentage of potash in the charge, such for example as the equivalent of one per cent KCN by weight of the pig iron produced, a withdrawal through the bosh outlet of one half the gas may remove from the furnace 90 per cent or more of the potash input. This substantially prevents accumulation of potash in the furnace and releases heat to be used for hearth work in smelting ore; the fixation of blast nitrogen being thus reduced to a minimum, so that the ore burden can be greatly increased. But by increasing the percentage of potash in the charge, which is readily done by returning to the furnace potash formed by hydrolysis of cyanide in chamber 21, the yield of cyanide can be greatly increased without decrease of the iron output. Thus the nitrogen fixing capacity is maintained by withdrawal of cyanide vapor through the bosh gas outlet, coordinated with the charge of alkali at the top of the furnace shaft. Thus, the bosh gas outlet affords means for improving the smelting efficiency of the blast furnace by control of the chemical activity of the blast nitrogen in forming cyanide vapor in the hearth. The outlet of hot cyanide vapor laden gas can be adjusted in coordination with the amount of potash charged to increase the smelting efficiency as desired by limiting the production of cyanide.

In the operation as described, it becomes possible to supply all needed blast heat by means of the heat interchanger or recuperator transferring sensible heat from bosh gas to the air blast, after condensation and removal of cyanide. In addition, it is noted that withholding from the shaft of surplus gas formed in the hearth has the result of preventing solution loss of coke; it being now possible to burn with air in the hearth all the carbon charged as fuel. In certain cases it is possible to burn with air excess carbon deposited in reversal of the solution loss reaction, that is, actually more carbon than the amount charged as fuel. This is an added function of the bosh gas outlet running through the bosh top cover.

In the furnace of Fig. 3, the heavy bosh wall extending to a greater height than the bosh of Fig. 1 or Fig. 2 has the advantage of conserving hearth heat and affording time for completion of smelting work devolving upon the hearth. The higher bosh has also the effect of purifying cyanide recovered from bosh gas.

An additional function of the bosh gas outlet running through the bosh top cover with the shaft and accessories as described is the use as blast furnace fuel of high ash bituminous coal undergoing low temperature carbonization in the shaft with recovery of volatile liquid hydrocarbons from shaft gases. The shaft gas is of high calorific value.

Another specific example of how the nitrogen fixing blast furnace functions is shown in Patent 2,261,516. Here the divided furnace is used to produce metal of high silicon content with cyanide byproduct and with recovery of coal volatiles in liquid form when desired.

What I claim is:

1. A nitrogen-fixing, gas-producing, silicon-reducing hot blast furnace which comprises a bosh and hearth section having air tuyères and means for blowing a blast of preheated air under pressure and a metal outlet at a level below the air tuyères, a roof member forming a top of said section, a gas outlet for withdrawing from the top of said section a major portion of the gases formed by the air blast, a cyanide-condenser and a heat interchanger preheating the air blast connected in series to said outlet, a separate shaft section having open communication through said roof member with the top of said bosh and hearth section and provided with solid fuel charging means and means maintaining the gas pressure and regulating the proportions of gas respectively passing from the hearth and bosh section through said gas outlet to said condenser and through said shaft section.

2. A metallurgical blast furnace divided into two integrated inter-communicating sections comprising hearth-bosh and shaft sections, the latter extending through a refractory cover member over the bosh, conduit means running through said cover providing unobstructed free passage of both solids and gases between said sections, means for charging solids into the furnace being provided near the end of the shaft section remote from the bosh cover, regulated gas outlet means running vertically upward through said bosh cover and adapted to withdraw from the furnace a large regulated fraction of the gas formed by the air blast in the hearth-bosh section, associated means for maintaining a substantial back pressure of gas in said outlet, means connected with said bosh gas outlet for recovering from the gas condensible gaseous nitrogen compounds formed by the air blast, connected heat interchanger means for pre-heating the air blast with sensible heat carried out of the furnace in gas withdrawn therefrom through said hot gas outlet and means for regulating the fraction of gas withdrawn.

3. A metallurgical blast furnace improved by having a hearth and bosh of usual construction provided with the conventional air tuyères and with means for admitting under pressure through the tuyères to the furnace a preheated air blast and also provided with a refractory roof cover interposed between the hearth-bosh and the shaft of the furnace, a shaft through which solid carbonaceous fuel is charged having open communication with the bosh at the top thereof through said roof cover, said communication providing unobstructed passage of both solids and gases a separate hot gas outlet of relatively large size leading from the top of the bosh through said roof cover away from the furnace, adjustable means associated with the shaft and hot gas outlet, respectively, for regulating the proportions of gas passed from the bosh through the shaft and withdrawn from the furnace through the hot gas outlet, means associated with the hot gas outlet for separately disposing of vapors of saline matter withdrawn from the furnace with the gas, and a heat interchanger preheating the air blast with sensible heat carried out of the furnace through said hot gas outlet.

4. A continuously operated hot blast furnace divided into two integral sections of bosh-hearth and shaft having a roof member covering the furnace bosh-hearth section of conventional type provided with conventional air tuyères and with means for introducing the preheated air blast under substantial positive pressure, a connection through said roof member providing unobstructed passage of solids and gases between said two sections of the furnace, a hot gas outlet running through said roof member and capable of withdrawing from the furnace for outside use a large fraction of the producer gas formed by the air, means for charging solid carbonaceous fuel at the end of the shaft section opposite to the bosh connection, throttling means in said hot gas outlet for maintaining a substantial positive pressure of gas within said bosh, means for recovering nitrogen compounds produced in the furnace and withdrawn with the gas, and means regulating the relative proportions of bosh gas passing from the bosh through said communicating shaft and through said hot gas outlet, respectively.

5. A continuously operated hot blast furnace divided into two integral hearth and shaft sections by a refractory roof member covering the furnace bosh-hearth section of conventional type provided with the conventional air tuyères and with means for introducing the preheated air blast under substantial positive pressure, the shaft section comprising a rotary horizontal kiln having an open connection with said bosh running through said roof member, and providing unobstructed passage of solids and gases between said two sections of the furnace, a hot gas outlet running through said roof member and capable of withdrawing from the furnace for outside use a large fraction of the hot producer gas formed by the air, means connected with said hot gas outlet for disposing of cyanide withdrawn from the furnace with the gas, means for charging solid carbonaceous fuel at the end of the shaft section opposite to the bosh connection, nozzle means connected with said hot gas outlet for restricting the flow of gas and for maintaining a substantial positive pressure of gas within said bosh and means regulating the relative proportions of hot gas passed from the bosh through said communicating shaft and through said hot gas outlet, respectively.

6. A nitrogen-fixing, gas-producing, silicon-reducing hot blast furnace which comprises a bosh and hearth section having air tuyères and means for blowing a blast of preheated air under pressure, and a metal outlet at a level below the air tuyères, a roof member forming a top of said section, a gas outlet for withdrawing from the top of said section a major portion of the gases formed by the air blast, means communicating with said gas outlet for recovering nitrogen compounds produced in the furnace and withdrawn with the gas, a separate shaft section having open communication through said roof member with the top of said bosh and hearth section and provided with solid fuel charging means, and means for separately regulating the gas passing through said shaft section and through said gas outlet from the hearth and bosh section.

7. A metallurgical blast furnace comprising a bosh and hearth section having air tuyères for admitting a preheated air blast, a roof member covering the bosh, a communicating shaft section separated from said bosh-hearth section by said roof member and delivering solids into the bosh through said roof, a vertically directed gas outlet provided in said roof, a gas conduit leading gases from said outlet, hot gas filtering means in said conduit, a heat interchanger receiving bosh gases from said conduit and adapted to recuperate sensible heat therefrom, means for blowing air through the interchanger to carry said recuperated heat in the air admitted to the air tuyères and means for regulating the relative proportions of gas passing from the hearth through said shaft section and through said gas conduit to said heat exchanger, respectively.

RICHARD FRANCHOT.